(12) United States Patent
Mangin

(10) Patent No.: US 11,095,759 B2
(45) Date of Patent: Aug. 17, 2021

(54) METHOD, ENTITY AND PROGRAM FOR TRANSMITTING COMMUNICATION SIGNAL FRAMES

(71) Applicant: MITSUBISHI ELECTRIC CORPORATION, Tokyo (JP)

(72) Inventor: Christophe Mangin, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 45 days.

(21) Appl. No.: 16/480,645

(22) PCT Filed: Mar. 20, 2018

(86) PCT No.: PCT/JP2018/012254
§ 371 (c)(1),
(2) Date: Jul. 24, 2019

(87) PCT Pub. No.: WO2018/174302
PCT Pub. Date: Sep. 27, 2018

(65) Prior Publication Data
US 2020/0014778 A1     Jan. 9, 2020

(30) Foreign Application Priority Data

Mar. 22, 2017   (EP) ...................................... 17305325
Jan. 26, 2018   (WO) .................. PCT/JP2018/003708

(51) Int. Cl.
*H04L 12/26*     (2006.01)
*H04L 29/06*     (2006.01)
(Continued)

(52) U.S. Cl.
CPC ............ *H04L 69/166* (2013.01); *H04L 47/28* (2013.01); *H04L 47/365* (2013.01); *H04L 47/50* (2013.01); *H04L 47/826* (2013.01)

(58) Field of Classification Search
CPC ....... H04L 47/28; H04L 47/36; H04L 47/365; H04L 47/50; H04L 47/6275; H04L 47/826; H04L 69/166; H04Q 11/06
See application file for complete search history.

(56) References Cited

U.S. PATENT DOCUMENTS 7,535,913 B2    5/2009  Minami et al.
2004/0202191 A1*  10/2004  Vrabel ................... H04L 47/16
                                                                370/412
(Continued)

FOREIGN PATENT DOCUMENTS

EP      3 057 273 A1    8/2016

OTHER PUBLICATIONS

Indian Office Action for Indian Application No. 201947036376, dated Nov. 13, 2020, with English translation.
(Continued)

*Primary Examiner* — Minh Trang T Nguyen
(74) *Attorney, Agent, or Firm* — Birch, Stewart, Kolasch & Birch, LLP

(57) ABSTRACT

The invention relates to a method implemented by a communicating entity in a packet-switched network, comprising at least one port for transmitting communication signal frames comprising a first type of frames, intended to be transmitted in a plurality of streams for which a traffic shaping is defined, and a second type of frames, for which no traffic shaping is defined, each frame being able to be fragmented so as to transmit a fragment only of a frame of said second type. The communicating entity stores a plurality of first queues of frames of the first type, the first queues being associated respectively to said plurality of streams, and at least one second queue for frames of the second type. The entity further schedules transmissions of first type frames, and between at least two first type frames, trans-
(Continued)

mission of at least a fragment of at least one second type frame.

9 Claims, 8 Drawing Sheets

(51) Int. Cl.
*H04L 12/841* (2013.01)
*H04L 12/805* (2013.01)
*H04L 12/863* (2013.01)
*H04L 12/911* (2013.01)

(56) References Cited

U.S. PATENT DOCUMENTS

2004/0213210 A1* 10/2004 Dube .................. H04L 47/781
                                                                370/352
2009/0296577 A1   12/2009 Gusat et al.
2016/0100421 A1*  4/2016 Ding .................. H04L 1/1628
                                                                370/336

OTHER PUBLICATIONS

International Search Report for PCT/JP2018/012254 (PCT/ISA/210) dated May 14, 2018.

\* cited by examiner

METHOD, ENTITY AND PROGRAM FOR TRANSMITTING COMMUNICATION SIGNAL FRAMES

TECHNICAL FIELD

The invention relates to packet-switched networks management.

BACKGROUND ART

Packet-switched networks are increasingly used for industrial control application thanks to the introduction of Layer-2 features that allow the transport of control data that cannot suffer latency and transfer delay variation.

For instance, low-latency sampling data, (closed loop) control and image streaming (e.g. image processing) have very stringent latency requirements. Image streaming and associated processing as a part of a control loop has greater requirements than best effort transport could provide in a converged network. In parallel, best effort stream is not time-critical, but provides a constant source for interference stream.

Solutions have been progressively developed, in particular for the adaptation of switched Ethernet to the requirements of industrial field busses: EtherCAT, Ethernet Powerlink, TCnet, PROFINET, etc.

All these solutions rely on specific additions to the standard Ethernet protocol that provide support for scheduled streams.

The common scheme used by these adaptations is based on an organization of the transmission multiplex in time windows, each window being reserved for a specific stream. The number and repetition frequencies of the time windows are determined according to the requirements of the applications.

Considering that the (industrial control) applications generating scheduled stream have a periodic activity, the transmission multiplex is organized in periodic cycles. Referring to FIG. 1, each cycle contains a series of time windows STW reserved for scheduled (low-latency) frames SF transmission, the rest of the transmission opportunities being devoted to non scheduled streams.

SUMMARY OF INVENTION

Technical Problem

However, some other control applications have less stringent latency or jitter requirements: embedded automotive control networks for example are among these applications. In these environments, the extra network engineering required by the computation of the schedules and the synchronization of traffic sources with the network can be avoided provided the chosen traffic management method guarantees limited jitter, bounded latency and zero-packet-loss to the critical control streams.

Traffic shaping according to a predefined data rate reserved throughout the network and negotiated by the source with the network is a technique that is well adapted to achieve these performance goals. It provides means to guaranty transmission delay bounds and fairness between the shaped streams.

To further reduce potential sources of latency due to the interference between shaped and non-shaped streams, pre-emption mechanisms can also be introduced. Preemption intervenes at the transition between a non-shaped stream transmission opportunity and a shaped stream transmission opportunity, as shown in FIG. 2. In particular, upon such a transition, the beginning of a shaped stream transmission opportunity SFTO can overlap the end of the transmission opportunity of an unshaped stream. In such a case, the frame of the shaped stream SF cannot be transmitted until the current transmission of a frame UF of a non-shaped stream ends.

As still shown on FIG. 2, by pre-empting the transmission opportunity of the residual part of the unshaped frame UF, it is possible to avoid additional delay to be suffered by the shaped stream SF. To facilitate the pre-emption operation, frames of the unshaped stream can be therefore fragmented (as shown in the lower part of FIG. 2, with the transmission of frag #1) causing the transmission of the remaining fragment(s) (frag #2 in the example of FIG. 2) to be delayed until the transmission opportunities of the shaped streams are complete.

So far, in order to provide efficient interworking between scheduled and non-scheduled streams, it has been proposed:

A first type of standard as IEEE802.1Qbv, defining a scheduling scheme relying on the reservation of time windows for different types of streams (scheduled and non-scheduled);

A second type of standard as IEEE802.3br and IEEE802.1Qbu defining a pre-emption scheme that specifies the fragmentation mechanisms applied to so-called "normal" frames upon the concurrent transmission of so-called "express" frames; typically belonging to scheduled streams.

IEEE802.1Qbv is based on a periodic calendar table, of which each entry defines a time window reserved for the transmission of a particular class of stream (e.g. scheduled or non-scheduled).

These standards provide then a complete framework for the transport of periodic scheduled streams with minimal latency, a similar service to those provided by the industrial standards cited above.

The mechanism specified in IEEE802.3br allows a MAC Client that has an "Express" traffic (here shaped streams) to preempt "Normal" frames' transmission (belonging to unshaped streams), before the transmission opportunities of shaped traffic starts. When a frame belonging to a shaped stream is scheduled for transmission, it can be transmitted immediately.

In addition, the IEEE802.3br standard defines a per-hop fragmentation and reassembly scheme of Normal frames that allows stopping the transmission of a Normal frame to give a transmission opportunity to an Express frame. Normal-frame fragments and Express-frames are distinguished by their preamble length and a "Start of Frame Delimiter" field. This allows non-express frames (Normal-frames) not to wait for a too long timeslot before being transmitted. This results in a limited added latency for Normal flows and a better use of the link capacity.

It is to be noted that only a single Normal-frame can be fragmented at any time (on the same link or in the same transmit port).

The minimum preempted fragment size is 64 bytes. Therefore, a packet with a length less than 128 bytes cannot be preempted, nor fragmented finally (without letting finally a fragment of less than 64 bytes). Moreover, non-final fragments have a length multiple of 8 bytes.

So far, the addition of residual latency due to interfering frames or fragments belonging to non scheduled stream can be avoided thanks to the availability of the exact times of beginning and end of transmission windows dedicated to normal (non-express) streams. Indeed, knowing when the next express traffic transmission window starts makes it possible to select the normal frame or fragment to be transmitted without any overlap with the express traffic transmission window.

However, when critical data transfers are supported by shaped or at least rate-controlled streams (even if such transfers do not require ultra-low latency), no mechanism is defined to guaranty that these streams do not suffer from additional latency due to interfering with non-critical frames or fragments transmission.

Using the state-of-the-art solution based on the current fragmentation standard (IEEE 802.3br and 802.1Qbu), multiplexing of shaped and unshaped streams can take benefit of the pre-emption but will still suffer from residual latency due to the transmission of frame fragments belonging to unshaped streams.

Solution to Problem

The invention aims to improve the situation.

To that end, the invention proposes a method implemented by computer means of a communicating entity in a packet-switched network, said communicating entity comprising at least one port for transmitting communication signal frames, said frames comprising:
 a first type of frames, intended to be transmitted in a plurality of streams for which a traffic shaping is defined, and
 a second type of frames, for which no traffic shaping is defined, each frame being able to be fragmented so as to transmit a fragment only of a frame of said second type.

More particularly, the communicating entity stores a plurality of first queues of frames of the first type, said first queues being associated respectively to said plurality of streams, and at least one second queue for frames of the second type. The communicating entity can therefore schedule transmissions of first type frames, and between at least two first type frames, transmission of at least a fragment of at least one second type frame. Moreover, to that end, for deciding to transmit a fragment only of a second type frame, the communicating entity can further determine whether the size of the fragment to be transmitted is greater than a threshold, and also whether the size of a remaining fragment of said second type frame is greater than that threshold. Otherwise, if these two conditions are not met, the communicating entity prevents from fragment transmission.

Therefore, thanks to the implementation of the invention, it is possible to organize the transmission of frames belonging to shaped streams (the aforesaid "first type" frames) so that the beginning and end time of transmission opportunities reserved for shaped traffic are dynamically determined along the transmission of the shaped streams and provide the time boundaries for the transmission opportunities of unshaped fragments or frames (the aforesaid "second type" frames).

In a possible embodiment, each of said first and second queues is stored in a first-in-first-out type buffer and a queue to which a first type frame is assigned is determined according to the stream to which that first type frame belongs, depending on features of said first type frame. Typically, information given in a header of the frame can be used to determine the type of that frame (belonging to shaped traffic or to unshaped traffic). Furthermore, features of said first type frame can include its length and a current rate of the stream to which said first type frame belongs. Therefore, the time taken for the transmission of each first type frame in its queue can be calculated (classically by dividing the length of frame by the stream rate), and respective transmission times can be scheduled accordingly for the first type frames.

Consequently, in this embodiment, the frame belonging to a shaped stream can be selected for transmission by comparing scheduled transmission times (noted TTTi hereafter) of frames placed at the head of each first queue, the frame associated to the smallest scheduled transmission time (noted miniTTTi) being selected as a next candidate for transmission.

In an embodiment where the communicating entity can perform a time counting for determining a current time, the communicating entity can therefore implement transmission of said next candidate if:
 the scheduled transmission time associated to said next candidate is smaller or equal to the current time, and if
 no other first type frame is currently being transmitted, and if
 no second type frame or fragment is currently being transmitted.

The communicating entity can determine furthermore whether a second type frame or frame fragment is currently being transmitted, and if yes whether that second type frame or frame fragment can be further fragmented for interrupting a transmission of said second type frame or frame fragment, and allowing thereby a transmission of the aforesaid next candidate.

In this embodiment, the communicating entity can implement a fragmentation of that second type frame or frame fragment:
 if the size of said second type frame or frame fragment which transmission is to be interrupted is greater than the aforesaid threshold, and
 if the size of a frame fragment to remain in said second queue after the interruption is greater than that threshold.

In an embodiment, for the purpose of the second type frames' transmission, the communicating entity can perform a time counting for determining a current time and implementing a second type frame fragmentation in view of fragment transmission:
 if no first type frame is currently being transmitted, and
 if no first type frame placed at a first queue head has a scheduled transmission time smaller or equal to the current time.

Moreover, a provision can be made so as to limit latency of the first type frames' transmission and to that end, the communicating entity can insert a probe frame at the head of at least one of the first queues, preferably the one comprising the next candidate for transmission, so as to avoid any latency of transmission of that next candidate.

The present invention aims also at a communicating entity, comprising at least one port for transmitting communication signal frames in a packet-switched network, and further comprising a computer circuit for performing the method as defined above. An example of embodiment of such a communicating entity is shown in FIG. 4 commented below.

The present invention aims also at a computer program product, comprising instructions for performing the method as defined above, when run by a processor. A general algorithm of such a computer program can be illustrated by way of an example by the flowcharts corresponding to FIGS. 5, 6, 9, 10 commented below.

More generally, the present invention is illustrated by way of example, and not by way of limitation, in the figures of the accompanying drawings, in which like reference numerals refer to similar elements.

DESCRIPTION OF EMBODIMENTS

The implementation of the invention makes it possible to limit the latency experienced by the shaped streams in the successive multiplexing stages encountered in the network. For that purpose, it takes advantage of a time-based scheduling mechanism used to dynamically define the transmission opportunities dedicated to the shaped streams in conjunction with pre-emption applied to the unshaped streams. The timing information provided by the time-based scheduling mechanism enables determining the size of frames or fragments candidate for transmission between shaped stream transmission opportunities.

Hereafter, express frames as defined in standard IEEE802.3br are frames belonging to shaped streams.

Normal frames as defined in standard IEEE 802.3br are frames belonging to unshaped streams (that typically support a so-called "Best Effort" transport service).

Normal frames can be segmented in fragments as per the standard IEEE802.3br.

Figure 1:
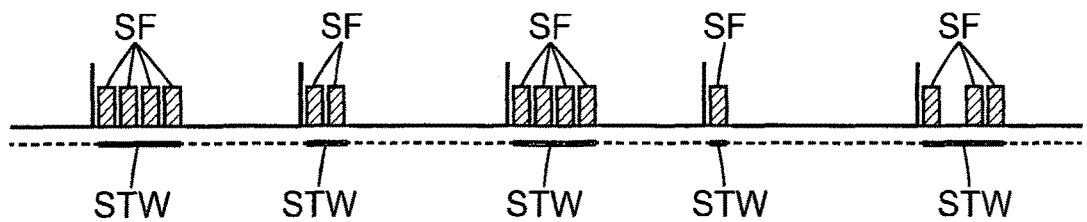
FIG. 1 shows a cyclic organization of a transmission multiplex according to prior art.
Figure 2:
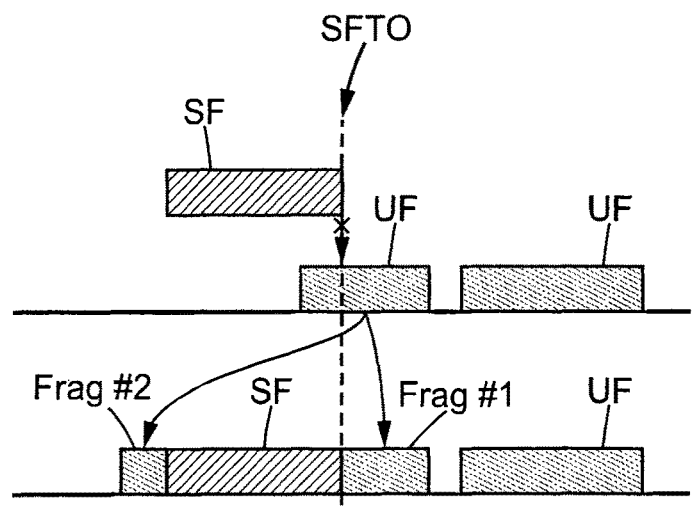
FIG. 2 shows unshaped frame fragmentation guarantying shaped frame transmission.
Figure 3:
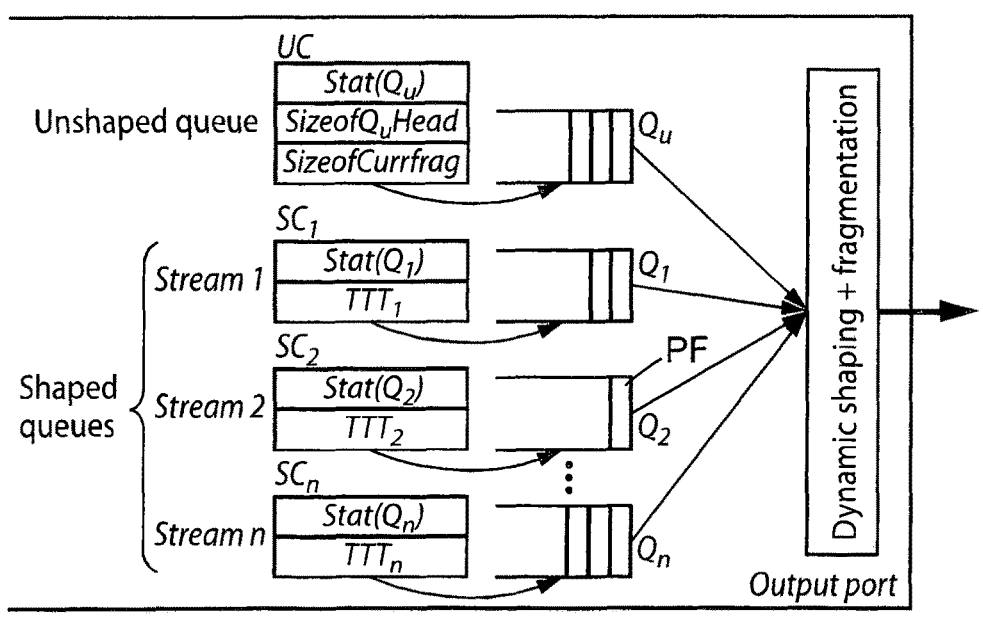
FIG. 3 shows shaped and unshaped queues in a transmission port (or "output port" hereafter) of a communicating entity according to the present invention.

The multiplexing scheme and involved parameters are described below with reference to FIG. 3.

Each shaped stream i is associated with a transmission rate $R_i$, and a queue $Q_i$ in an egress port of each communicating entity of the packet-switched network. In an embodiment, a communicating entity can be a multiplexing node through which the stream passes. In an alternative embodiment, a communicating entity can be a terminal transmitting received frames in a peer-to-peer communication configuration, and/or simply emitting its own frames.

The aforesaid transmission rate $R_i$ is expressed in bit per second. For all shaped streams i, the sum of $R_i$ is less than the total link (or port) transmission rate $\rho$. Furthermore, a packet to transmit is supposed to be made of octets, each octet corresponding to 8 bits, and this explains the value "8" which appears later in the drawings (for example test S35 of FIG. 10 commented below).

$R_i$ is reserved in the successive nodes traversed by stream i by means of signalling or network administration.

Packets of stream i are stored in memory buffers organized as FIFO (First In First Out), defining an order in queue $Q_i$.

Time is represented by a variable T that is incremented every bit transmission time (at the link rate) and is usually the same for all links and ports of a node.

Each shaped stream i is associated with a stream context $SC_i$ that contains the variables required for the shaping mechanism, e.g.:

The status of the associated shaped transmit queue in the output port, $Stat(Q_i)$, which can take the values empty (0) or not empty (1);

A Theoretical Transmission Time of the frame stored at the head of the associated shaped transmit queue, noted hereafter $TTT_i$ For the sake of simplification here, all unshaped streams are allocated with a single dedicated queue: the unshaped transmit queue $Q_u$ that stores the frames in FIFO order.

A queue context is associated with the unshaped transmit queue, UC, containing three variables:

The status of the unshaped queue, $Stat(Q_u)$, which can take the values empty (0) or not empty (1);

The size of the frame or remaining fragment stored at the head of the unshaped queue: sizeofQuHead;

The number of bytes transmitted since the beginning of the current unshaped frame or fragment transmission: sizeofCurrFrag, updated upon the transmission of each byte.

Considering the transmission of frames belonging to unshaped streams, a fragment cannot be shorter than a defined minimum fragment size MinFragSize. Typically, a frame fragment shall include at least:
  a header,
  an indication of a position of the fragment (at least first fragment, or intermediate fragment, or last fragment of a frame),
  a CRC code at the end of the fragment, and hopefully data in between.

In fact, the minimum size MinFragSize cannot be less than a size corresponding to these requirements, but more generally cannot be less than the minimum size of an Ethernet frame (e.g. 64 bytes as previously indicated).

The transmission of a shaped frame is indicated by the ShapedTxBusy flag, set to 1 during the transmission, and reset to 0 otherwise.

The transmission of an unshaped frame or fragment is indicated by the UnshapedTxBusy flag, set to 1 during the transmission, and reset to 0 otherwise. The StopUnshapedTx flag is used to trigger the interruption of the transmission of an unshaped frame when a shaped frame transmission time is due.

Figure 4:
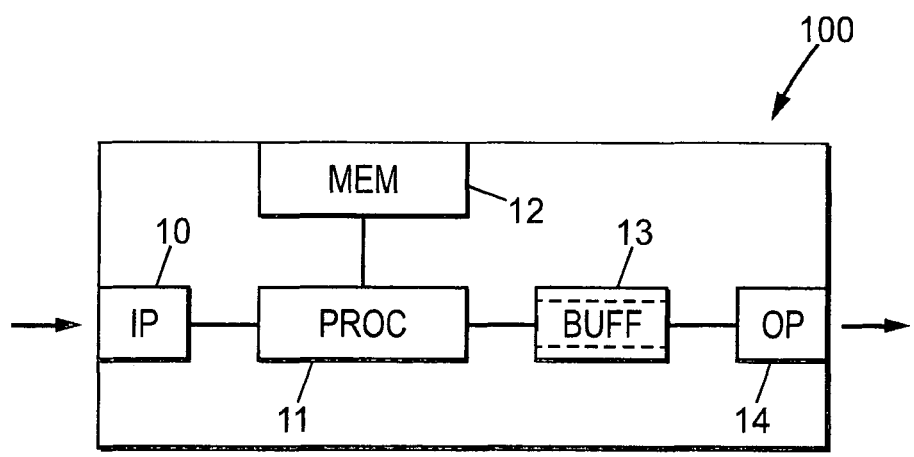
FIG. 4 shows schematically a computer circuit (FPGA, integrated chip, or any other computer circuit) of a communicating entity according to an embodiment of the present invention.

These operations can be implemented by a communicating entity 100 (node of a network, or terminal device in a peer-to-peer network, etc.), schematically shown in FIG. 4 and comprising:
- one or several input ports 10 receiving the frames to process,
- one or several output ports 14 to transmit the received frames (and/or any other frames to be sent by the communicating entity 100 for its direct needs),
- one or several buffer memories 13 storing at least queues of frames before their transmission as detailed below, and
- a computer circuit comprising for example a processor 11 cooperating with a memory 12 storing at least instructions of a computer program for performing the method according to an embodiment of the invention.

Figure 5:
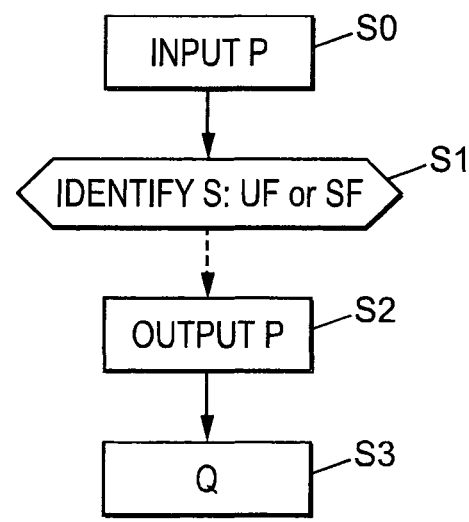
FIG. 5 shows operations performed by an input port and/or any other part of the communicating entity generating frames to be transmitted by the transmission port of the communicating entity.

FIG. 5 shows an example of operation of the input ports 10 of such a communicating entity 100.

In a first step S0, the stream to which received frames belong is identified in the input port in order to determine whether the received frames are shaped frames or rather unshaped frames (step S1) and further in which transmit queue(s) the received frames have to be forwarded to. This identification uses information contained in the frame header and/or payload to determine:
- The destination output port (step S2), and
- The destination transmit queue Q within the selected output port (step S3).

Figure 6A:
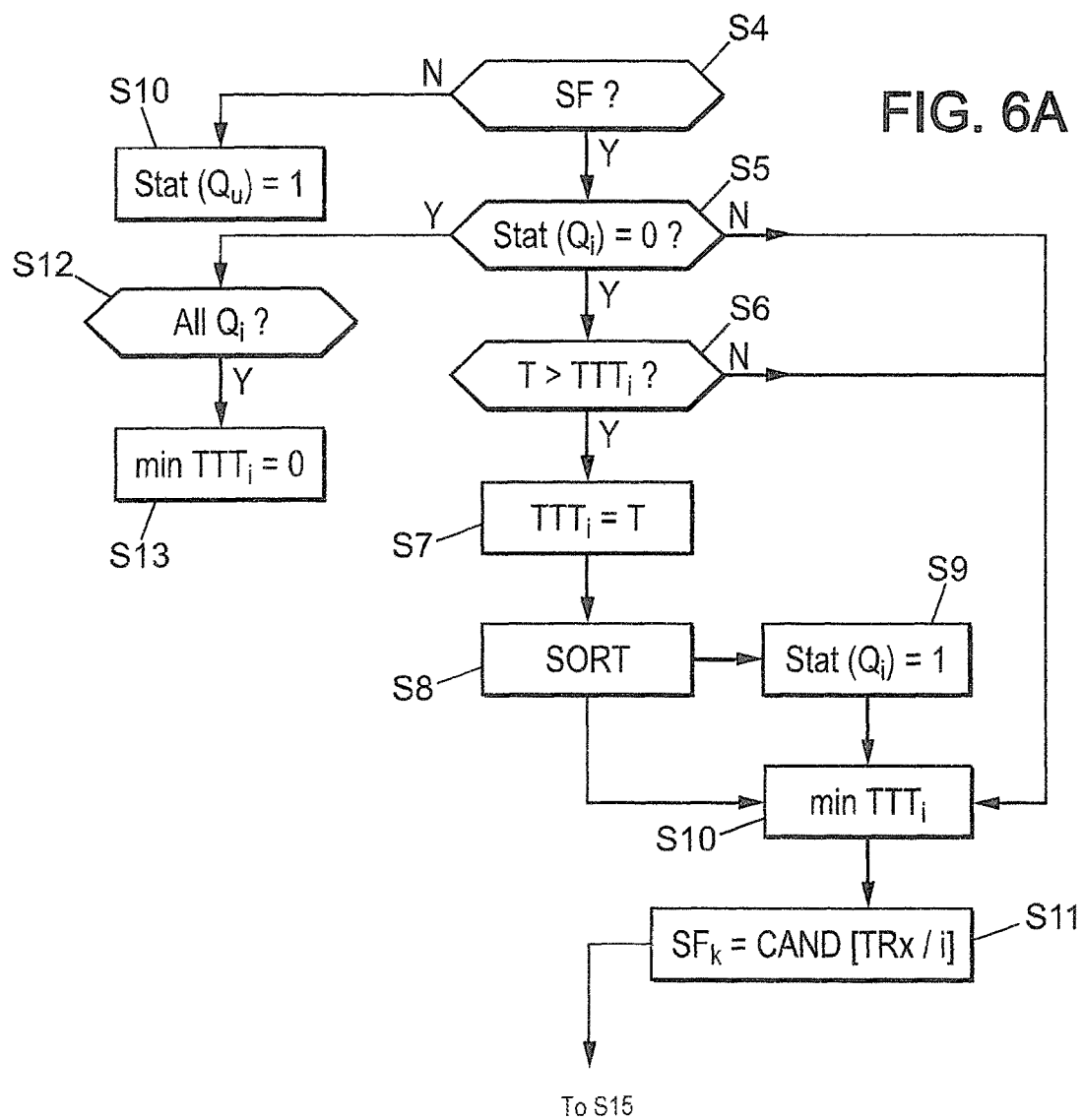
FIG. 6A shows operations performed by the communicating entity for transmitting a shaped frame from its transmission port.
Figure 6B:
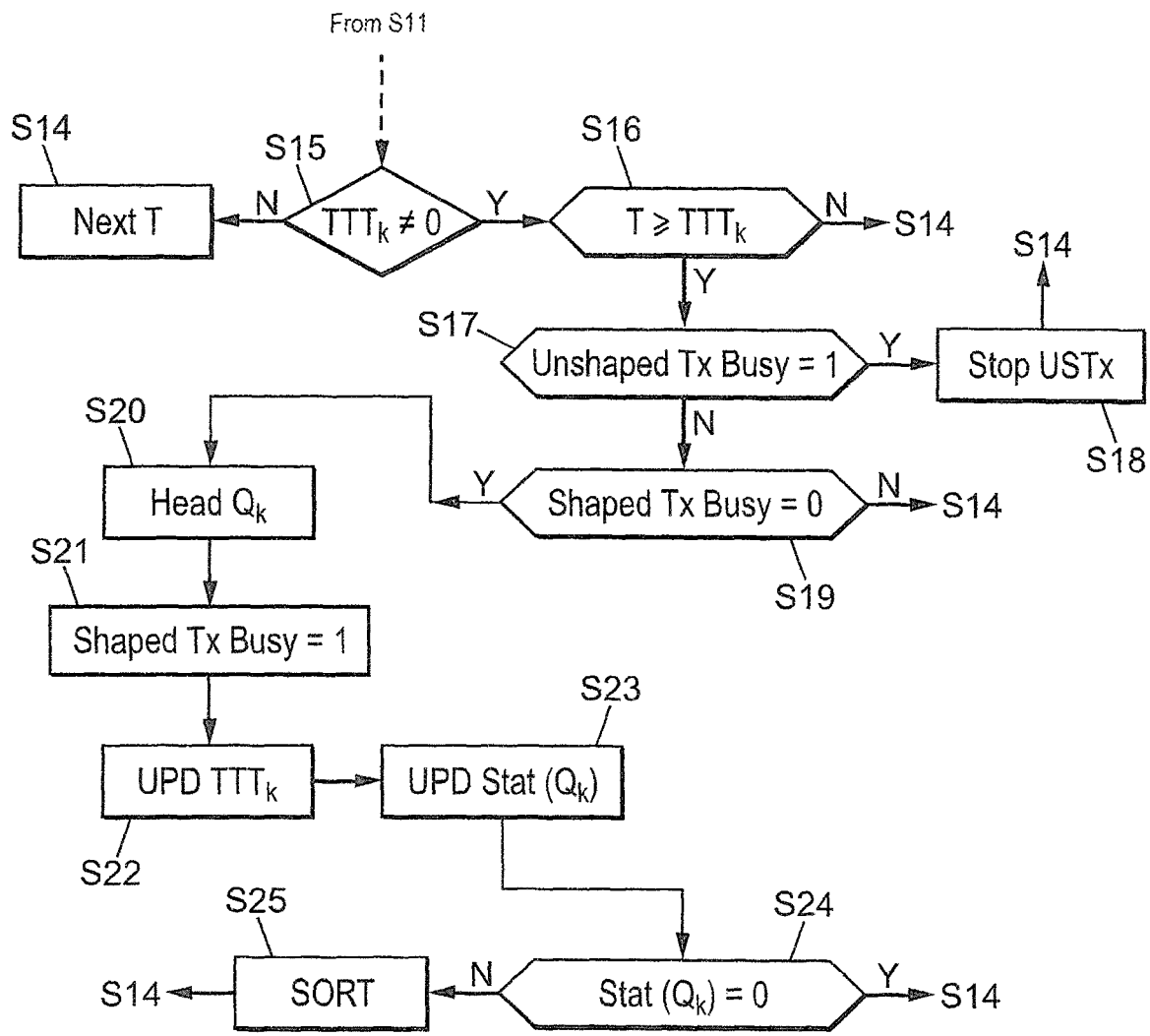
FIG. 6B shows operations performed by the communicating entity for transmitting a shaped frame from its transmission port.

The operation in the transmit ports 14 is now disclosed with reference to FIGS. 6A and 6B.

In case of receiving a shaped frame (arrow Y at output of test S4) and upon storing that frame in the shaped transmit queue Qi the following operations are performed:
- At test S5, if Stat(Qi)=0, then test S6 is performed and if T>TTTi, then TTTi=T at step S7;
- then TTTi value is injected in a sorting function at step S8 (as explained in details below);
- then the value Stat(Qi) is set to Stat(Qi)=1 (step S9).

It is added here that regarding the unshaped stream, upon storing a frame in the unshaped transmit queue Qu (arrow N from test S4) Stat(Qu) is set to not empty (=1), in step S10.

Now is disclosed the transmission of a frame belonging to a shaped stream.

The frame belonging to a shaped stream to be transmitted is selected by comparing all TTTi (using thus the aforesaid sorting function). The frame associated to the smallest TTTi value (as determined in step S10) is determined in step S11 as the next candidate for transmission. For this purpose, the sorting function maintains the smallest TTTi, with i such that Stat(Qi)=1 (i.e. for which the queue is not empty). That smallest TTTi being noted hereafter minTTTi.

If Stat(Qi) equals 0 for all streams i (i.e. all the shaped queues are empty, as determined in step S12) then minTTTi takes the null value in step S13.

Figure 7A:
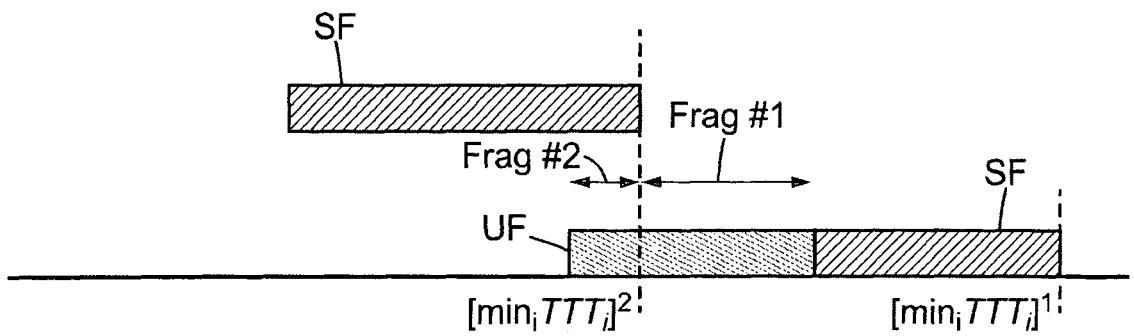
FIG. 7A shows transmission conditions for a shaped frame, in consistence with the embodiment of FIGS. 6A and 6B, in case of fragment transmission of unshaped frame, the scheduled transmissions time being here from right ([miniTTTi]1) to left ([miniTTTi]2).
Figure 7A:
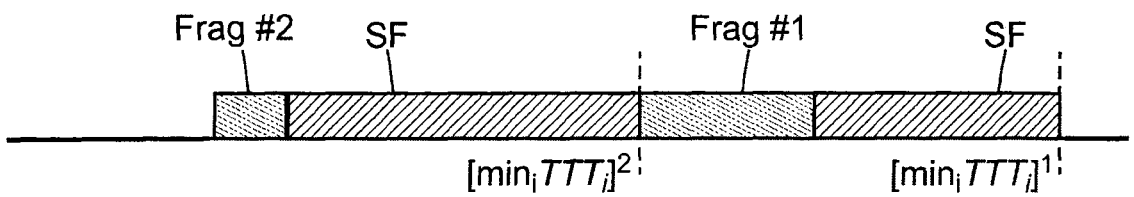

If an unshaped frame (or fragment) is currently being transmitted as shown in FIG. 7A, it is checked whether it can be (re)fragmented. To that end:
- the size of the frame (or fragment), which transmission is to be interrupted, must be greater than MinFragSize,
- and the size of the fragment remaining in the unshaped queue after transmission interruption must be also greater than MinFragSize.

Figure 7B:
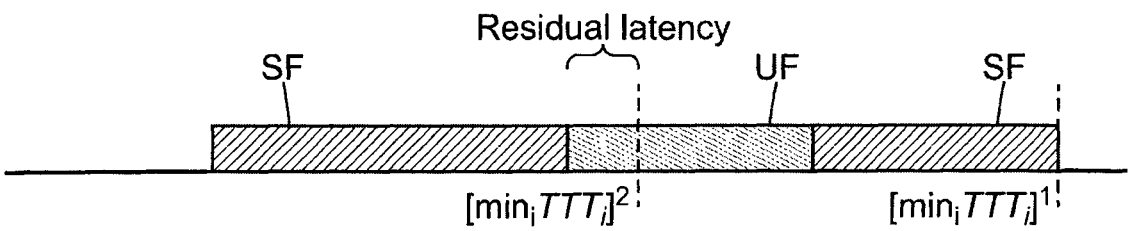
FIG. 7B shows transmission conditions for a shaped frame, in consistence with the embodiment of FIGS. 6A and 6B, in case of impossibility to transmit a fragment of unshaped frame, the scheduled transmissions time being here from right ([miniTTTi] 1) to left ([miniTTTi]2).

If both these two conditions are not met together, the normal transmission of unshaped frame (or fragment) continues as usual without further fragmentation, as shown in FIG. 7B.

Otherwise, as shown in FIG. 7A, when fragmentation of the unshaped frame is possible, fragments of the unshaped frame can be transmitted between transmissions of shaped frames.

Therefore, a shaped frame is effectively transmitted mainly when:
- TTTi is due, i.e. the current time T is greater or equal TTTi,
- There is no frame belonging to another shaped stream currently being transmitted,
- There is no frame or fragment belonging to an unshaped stream currently being transmitted.

Referring again to FIGS. 6A and 6B, the following operations are performed upon each increment of time variable T by 1 time unit in step S14. The shaped frame to be transmitted (having the lowest TTTi) as determined in step S11, has the index k and thus TTTk=minTTTi. In step S15, the result of the test should be normally TTTk≠null since a frame is received at step S11. Furthermore, if T≥TTTk at step S16, then test S17 is performed so as to determine whether the transmission of an unshaped frame is currently in progress or not. If yes (UnshapedTxBusy=1), then a request for stopping that current transmission is set at step S18 (StopUnshapedTx=1). Otherwise (arrow N from test S17), it is assessed further whether the transmission of a shaped frame is in progress or not in test S19. If not (ShapedTxBusy=0), then in step S20, the shaped frame to transmit is placed at the head of Qk.

Then, updates are performed for the next time T. In step S21, the parameter ShapedTxBusy is updated to "1" for size(frame)*8/ρ. In step S22, the TTTk value is also updated to TTTk=TTTk+size(frame)*8/Rk, as well as Stat(Qk) in step S23. Moreover, at test S24, if Stat(Qk) is not null, than TTTk is injected in the sorting function again at step S25.

Figure 9:
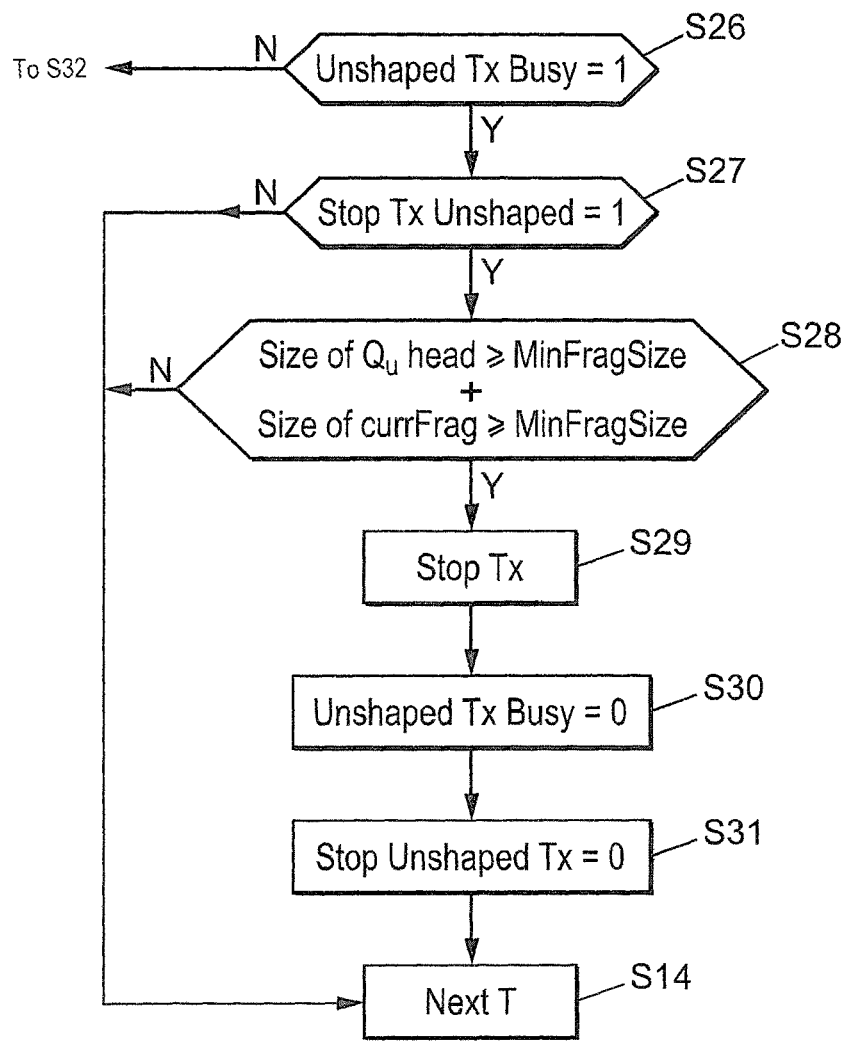
FIG. 9 shows operations performed by the communicating entity for transmitting an unshaped frame from its transmission port, in consistency with FIG. 8, in the case where the transmission of an unshaped frame or fragment is already in progress (arrow Y from test S26).

For the purpose of transmission and fragmentation of a frame belonging to an unshaped stream, details are now given hereafter while referring to FIG. 9. As a general rules, the transmission of a frame belonging to an unshaped stream starts if the following conditions are met:
- No frame belonging to a shaped stream is currently being transmitted,
- If no frame stored in one of the shaped queues has a transmission time which is due already (current time T greater or equal to its TTTi).

The theoretical transmission time of the next-to-be-transmitted frame belonging to a shaped stream is therefore used to check if the unshaped frame can be transmitted, or fragmented.

Finally, a first fragment of the unshaped frame is transmitted only if both its length and the length of the fragment remaining in Qu are greater or equal to MinFragSize.

If not, no transmission occurs from the unshaped queue.

Indeed, as seen before, in case where a new shaped frame must be transmitted while an unshaped frame transmission is pending, the transmission of the unshaped frame can be interrupted only if:
- the length of the fragment transmitted up to the interruption is greater or equal MinFragSize, and the length of the fragment to remain in the unshaped queue after the interruption is greater or equal MinFragSize.

Figure 8:
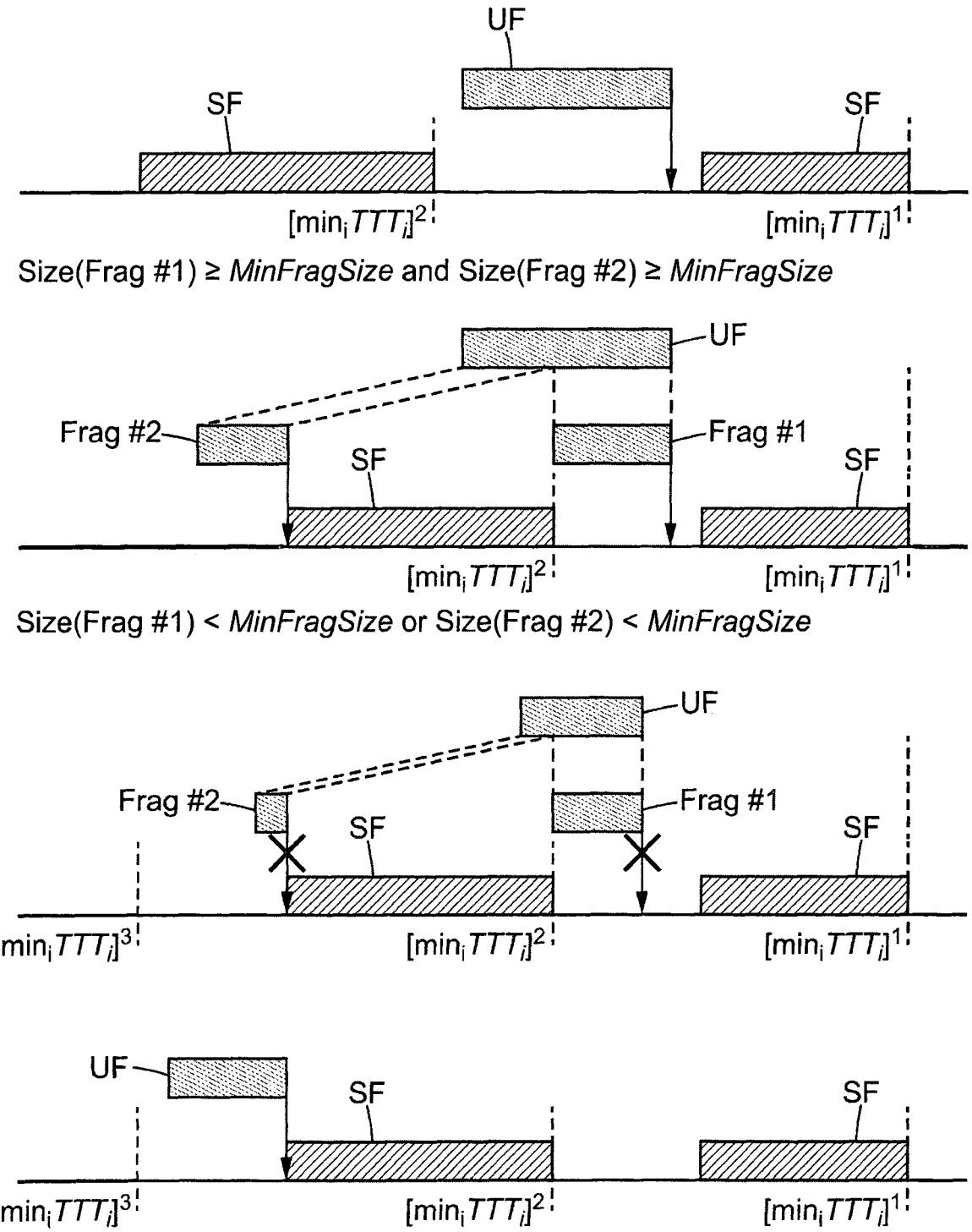
FIG. 8 shows transmission and fragmentation conditions for an unshaped frame.

If anyone of the above conditions is not met, the transmission of the unshaped frame cannot be interrupted, as shown in FIG. 8.

Referring to FIG. 9, the following operations are performed upon each increment of time variable T by 1 time unit.

If UnshapedTxBusy=1 (test S26), and if StopTxUnshaped=1 (test S27), and if (sizeofQuHead≥MinFragSize and sizeofCurrFrag≥MinFragSize) in test S28, then the current frame transmission is stopped at step S29. Then, updates are performed and UnshapedTxBusy is set to null (step S30) and StopUnshapedTx is set to null (step S31).

Time T is incremented by '1' (step S14) for a next run.

Figure 10:
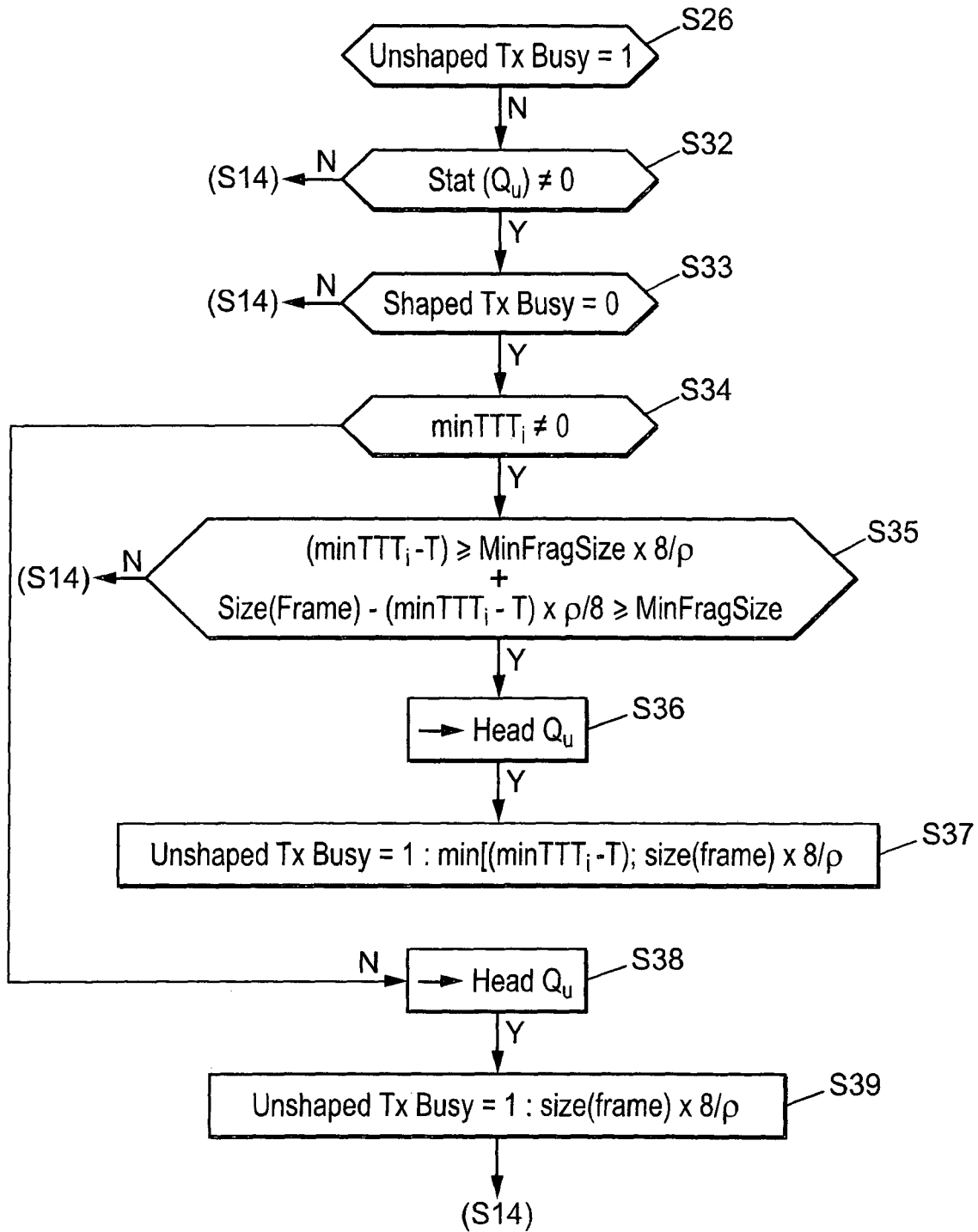
FIG. 10 shows operations performed by the communicating entity for transmitting an unshaped frame from its transmission port, in consistency with FIG. 8, in the case where no transmission of an unshaped frame or fragment is currently in progress (arrow N from test S26 starting FIG. 10).

Otherwise, referring now to FIG. 10, if UnshapedTxBusy≠1 (arrow N from test S26), it is processed further to the following tests:

if Stat(Qu)≠0 (test S32), and
if ShapedTxBusy=0 (test S33), and
if $\min_i TTTi \neq null$ (test S34),
if both the following conditions are met:

[(min$TTTi$−T)≥MinFragSize*8/ρ] and [size(frame)−(min$TTTi$−T)*ρ/8≥MinFragSize](test S35), then the current frame or fragment is transmitted at the head of queue Qu in step S36, and the parameter UnshapedTxBusy is set to 1 at step S37 during the minimum value between:

(minTTTi−T) and
size(frame)*8/ρ (to that end, a corresponding temporisation can be provided).

However, in test S34 (arrow N), if $\min_i TTTi$=null, then in step S38, it is time to transmit the frame or fragment at the head of Qu and in step S39 to set UnshapedTxBusy to 1 during a time corresponding to size(frame)*8/ρ.

Then, the next run is implemented when time T is incremented in step S14.

It should be noted that residual latency can be eliminated by the provision of a "probe" frame PF inserted in the shaped stream as explained hereafter. Such a probe frame PF can be inserted at the head of each shaped stream queue. In fact, when typically a frame of a shaped stream is transmitted after a period of silence for example, it may happen the case where the transmission of an unfragmentable unshaped frame or fragment cannot be aborted (due to the size of the produced fragments for example), and it cannot be given a way to the immediate transmission of a shaped frame instead, as shown in FIG. 7B. In order to avoid the resulting residual latency, a "probe" frame can be inserted in the shaped stream so that the first shaped frame following this probe does not experience any latency under such circumstances. In an alternative embodiment which is shown in FIG. 3, one probe frame PF only can be inserted at the head of the shaped frames queue Qk (with k=2 in the example of FIG. 3) and the next candidate for transmission in queue Qk will not suffer from any latency.

More generally, the invention is targeted at packet-switched networks capable of forwarding preemption, and can provide low latency data transfer to time-critical applications that are transported on non-cyclic rate-controlled streams. Typically, it can be applied in embedded control networks such as industrial or automotive networks.

The invention claimed is:

1. A method implemented by computer means of a communicating entity in a packet-switched network, said communicating entity comprising at least one port for transmitting communication signal frames, said frames comprising:
a first type of frames (SF), intended to be transmitted in a plurality of streams for which a traffic shaping is defined, and
a second type of frames (UF), for which no traffic shaping is defined, each frame being able to be fragmented so as to transmit a fragment only of a frame of said second type,
wherein the communicating entity:
stores:
a plurality of first queues of frames of the first type, said first queues (Qi) being associated respectively to said plurality of streams, and
at least one second queue (Qu) for frames of the second type,
and schedules:
transmissions of the first type frames, and
between at least two first type frames, transmission of at least a fragment of at least one second type frame, and
wherein, for deciding to transmit a fragment only of a second type frame, the communicating entity determines:
whether the size of the fragment to be transmitted is greater than a threshold (MinFragSize), and
whether the size of a remaining fragment of said second type frame is greater than said threshold,
and otherwise prevents from fragment transmission,
wherein each of said first and second queues is stored in a first-in-first-out type buffer (BUFF), and wherein a queue to which a first type frame is assigned is determined according to the stream to which said first type frame belongs, depending on features of said first type frame, and
wherein a frame belonging to a shaped stream is selected for transmission by comparing scheduled transmission times (TTTi) of frames placed at the head of each first queue, the frame associated to the smallest scheduled transmission time (miniTTTi) being selected as a next candidate for transmission.

2. The method of claim 1, wherein said features of said first type frame include a frame length and a current rate of the stream to which said first type frame belongs, and
wherein a time taken for the transmission of each first type frame in its queue is calculated and respective transmission times are scheduled for said first type frames according to said respective times taken for the transmissions of the first type frames.

3. The method of claim 1, wherein the communicating entity performs a time counting for determining a current time (T) and implements transmission of said next candidate if:
the scheduled transmission time (TTTk.) associated to said next candidate is smaller or equal to the current time (T), and if
no other first type frame is currently being transmitted, and if
no second type frame or fragment is currently being transmitted.

4. The method according to claim 1, wherein the communicating entity determines whether a second type frame or frame fragment is being transmitted, and if yes whether said second type frame or frame fragment can be further fragmented for interrupting a transmission of said second type frame or frame fragment, and allowing thereby a transmission of said next candidate.

5. The method of claim 4, wherein the communicating entity implements a fragmentation of said second type frame or frame fragment:
- if the size of said second type frame or frame fragment which transmission is to be interrupted is greater than said threshold (MinFragSize), and
- if the size of a frame fragment to remain in said second queue after the interruption is greater than said threshold.

6. A communicating entity, comprising at least one port for transmitting communication signal frames in a packet-switched network, and further comprising a computer circuit for performing the method according to claim 1.

7. A non-transitory computer readable medium having stored there on a program comprising instructions for performing the method as claimed in claim 1, when run by a processor.

8. A method implemented by computer means of a communicating entity in a packet-switched network, said communicating entity comprising at least one port for transmitting communication signal frames, said frames comprising:
- a first type of frames (SF), intended to be transmitted in a plurality of streams for which a traffic shaping is defined, and
- a second type of frames (UF), for which no traffic shaping is defined, each frame being able to be fragmented so as to transmit a fragment only of a frame of said second type, wherein the communicating entity:
stores:
- a plurality of first queues of frames of the first type, said first queues (Qi) being associated respectively to said plurality of streams, and
- at least one second queue (Qu) for frames of the second type, and schedules:
- transmissions of the first type frames, and
- between at least two first type frames, transmission of at least a fragment of at least one second type frame, and wherein, for deciding to transmit a fragment only of a second type frame, the communicating entity determines:
- whether the size of the fragment to be transmitted is greater than a threshold (MinFragSize), and
- whether the size of a remaining fragment of said second type frame is greater than said threshold, and otherwise prevents from fragment transmission, wherein the communicating entity performs a time counting for determining a current time and implements a second type frame fragmentation in view of fragment transmission:
- if no first type frame is currently being transmitted, and
- if no first type frame placed at a first queue head has a scheduled transmission time (TTTi) smaller or equal to the current time (T).

9. The method according to claim 1, wherein said communicating entity inserts a probe frame (PF) at the head of at least one of the first queues comprising said next candidate for transmission, so as to avoid any latency of transmission of said next candidate.

* * * * *